US012616625B2

(12) United States Patent
Lai et al.

(10) Patent No.: US 12,616,625 B2
(45) Date of Patent: May 5, 2026

(54) MUSCLE TONE ASSESMENT DEVICE AND ASSESMENT METHOD THEREOF

(71) Applicant: HIWIN TECHNOLOGIES CORP., Taichung City (TW)

(72) Inventors: Jia-Wei Lai, Taichung City (TW); Che-Wei Chan, Taichung City (TW)

(73) Assignee: HIWIN TECHNOLOGIES CORP., Taichung City (TW)

( * ) Notice: Subject to any disclaimer, the term of this patent is extended or adjusted under 35 U.S.C. 154(b) by 1006 days.

(21) Appl. No.: 17/825,887

(22) Filed: May 26, 2022

(65) Prior Publication Data

US 2023/0381049 A1 Nov. 30, 2023

(51) Int. Cl.
*A61H 1/02* (2006.01)

(52) U.S. Cl.
CPC ... *A61H 1/0266* (2013.01); *A61H 2201/1215* (2013.01); *A61H 2201/5061* (2013.01); *A61H 2201/5069* (2013.01)

(58) Field of Classification Search
CPC .......... A61H 1/0266; A61H 2201/1215; A61H 2201/5061; A61H 2201/5069
See application file for complete search history.

(56) References Cited

U.S. PATENT DOCUMENTS 11,246,786 B2 * 2/2022 Tsui ..................... A61H 1/0288
11,534,654 B2 * 12/2022 Silcock ............. A63B 24/0062
12,420,137 B2 * 9/2025 Carruthers ......... A63B 24/0062
12,420,142 B2 * 9/2025 Knight ................. A61B 5/6807
12,420,145 B2 * 9/2025 Mason ............... A63B 24/0075
2015/0257679 A1 * 9/2015 Ross ....................... G01L 5/162 702/44
2015/0374278 A1 * 12/2015 Hsieh ..................... A61B 5/486 482/8
2019/0168069 A1 * 6/2019 Chizhov .............. A61H 1/0237
2019/0192914 A1 * 6/2019 Langford ......... A63B 21/00196
2019/0366146 A1 * 12/2019 Tong ....................... A61B 5/389
2020/0016459 A1 * 1/2020 Smith .................... B62M 3/086
(Continued)

FOREIGN PATENT DOCUMENTS

CN 102614066 8/2012
CN 112617837 A 4/2021
(Continued)

*Primary Examiner* — Jeffrey G. Hoekstra
(74) *Attorney, Agent, or Firm* — MUNCY, GEISSLER, OLDS & LOWE, P.C.

(57) ABSTRACT

A muscle tone assessment device includes a pedal, a front force sensor and a back force sensor arranged at the pedal, and a controller connected to the sensors. The controller obtains a front force standard deviation, a back force standard deviation, a front force deviation and a back force deviation from the sensing results, and obtains a first and a second threshold value from the front force standard deviation and the back force standard deviation. The front force standard deviation and the back force standard deviation are the standard deviations of the front force signal and the back force signal within a first time interval. The front force deviation and the back force deviation represent the deviation of the front force signal and the back force signal in a second time interval. In addition, the present invention further provides a muscle tone assessment method.

5 Claims, 10 Drawing Sheets

(56) References Cited

U.S. PATENT DOCUMENTS

| | | | | |
|---|---|---|---|---|
| 2020/0282263 | A1 * | 9/2020 | Hsieh | A63B 24/0087 |
| 2020/0289889 | A1 * | 9/2020 | Hacking | A61B 5/0205 |
| 2021/0086027 | A1 * | 3/2021 | Lin | A61H 1/0237 |
| 2021/0138304 | A1 * | 5/2021 | Mason | A63B 24/0075 |
| 2021/0260444 | A1 * | 8/2021 | Huang | A63B 24/0087 |
| 2022/0047921 | A1 * | 2/2022 | Bissonnette | A63B 24/0006 |
| 2022/0262483 | A1 * | 8/2022 | Rosenberg | G16H 40/63 |
| 2022/0273986 | A1 * | 9/2022 | Mason | A63B 22/0694 |
| 2022/0288460 | A1 * | 9/2022 | Mason | A61B 5/1071 |
| 2023/0381049 | A1 * | 11/2023 | Lai | A61H 1/0266 |

FOREIGN PATENT DOCUMENTS

| | | | | | |
|---|---|---|---|---|---|
| CN | 113261962 | A | | 8/2021 | |
| CN | 113730879 | A | | 12/2021 | |
| KR | 102610793 | B1 | * | 12/2023 | A63B 69/00 |
| TW | M311442 | | | 5/2007 | |
| TW | 202010550 | A | | 3/2020 | |
| WO | WO-0219907 | A1 | * | 3/2002 | A61B 5/224 |
| WO | WO-2005077470 | A1 | * | 8/2005 | A61H 1/0266 |
| WO | WO-2006126708 | A1 | * | 11/2006 | A61H 3/00 |
| WO | WO-2018068037 | A1 | * | 4/2018 | A63B 21/00178 |
| WO | WO-2019213012 | A1 | * | 11/2019 | A61B 5/296 |

* cited by examiner

MUSCLE TONE ASSESMENT DEVICE AND ASSESMENT METHOD THEREOF

BACKGROUND OF THE INVENTION

1. Field of the Invention

The present invention relates to the assessment technology of muscle tension, in particular to a muscle tone assessment device and an assessment method thereof.

2. Description of the Related Art

Spasticity is a disorder of muscle movement, usually caused by damage to the brain or spinal cord that controls voluntary movement, such as cerebral palsy, multiple sclerosis, stroke, or amyotrophic lateral sclerosis. These injuries cause changes in the balance of signals between the nervous system and muscles, increasing muscle tone. If the muscle tension is too high, the movement angle of the joint may be limited, which will not achieve a good rehabilitation effect. Therefore, before the patient uses the lower limb training machine for rehabilitation, the physical therapist usually massages the affected limb with bare hands to reduce the muscle tension of the affected limb. However, the above methods completely depend on the experience and subjective feeling of the physical therapist, and it is difficult to accurately assess whether the patient is suitable for rehabilitation and the degree of rehabilitation that can be carried out.

On the one hand, the ankle joint rehabilitation device disclosed in TW M311442 uses a rotating plate to fix the foot, and on the other hand, uses a first support member and a second support member to fix the thigh and calf respectively. The torque value of the transmission shaft is sensed by the torque sensor arranged between the rotating plate and the actuator, so as to evaluate the maximum range of motion of the foot joint and whether the muscle tension is too high. However, the aforementioned ankle joint rehabilitation device must keep the patient in a sitting position during use, and the patient needs to be moved when using the lower limb training machine for rehabilitation training, which is inconvenient to use and consumes rehabilitation time.

The affected limb training device disclosed in the CN 102614066 B uses a controller to detect the current change of the motor driving unit, then estimates the tension change of the affected limb according to the detected current change, and adjusts the speed of movement and the range of motion at the same time. However, the distance from the ankle joint to the bottom of the foot varies from different patients, so the current change detected by the control unit may be inaccurate. In addition, the aforementioned affected limb training device can only keep the patient in a sitting or lying position when in use. If the lower limb training machine is to be used continuously for rehabilitation training, the patient needs to be moved, which is inconvenient to use and consumes rehabilitation time.

SUMMARY OF THE INVENTION

The present invention has been accomplished under the circumstances in view. It is the main object of the present invention to provide a muscle tone assessment device, which can accurately determine whether a patient's muscles are in a state of high tension, and can perform subsequent gait training without moving the patient.

To achieve this and other objects of the present invention, the muscle tone assessment device of the present invention comprises a calf support unit, an actuating unit, a sensing unit, and a controller. The calf support unit is used to support a lower leg. The calf support unit comprises a pedal. The pedal comprises a pedaling area. The pedaling area is used to carry the foot. The actuating unit is adapted for driving the pedal to rotate. The sensing unit comprises at least one front force sensor and at least one back force sensor. The at least one front force sensor is embedded in the pedal and located in a front side relative to the pedaling area for sensing a front pedaling force and correspondingly sending a front force signal. The at least one back force sensor is embedded in the pedal and located in an opposing rear side relative to the pedaling area for sensing a back pedaling force and correspondingly sending a back force signal. The controller is electrically connected to the sensing unit. Before the actuating unit drives the pedal, the controller calculates a front force standard deviation and a back force standard deviation respectively according to several force values of the front force signal and the back force signal in a first time interval and also calculates a first threshold value and a second threshold value according to the front force standard deviation and the back force standard deviation. After the actuating unit drives the pedal, the controller respectively calculates a front force deviation and a back force deviation of the front force signal and the back force signals in each second time interval relative to the first time interval where the second time interval is less than said first time interval; when said front force deviation is greater than the first threshold value and the back force deviation is greater than the second threshold value, it means that a state of high tension occurs in the muscles of the lower leg.

It can be seen from the above that the muscle tone assessment device of the present invention depends on whether the front force deviation is greater than the first threshold value and whether the back force deviation is greater than the second threshold value to determine whether the state of high tension of the muscles of the lower leg occurs.

Preferably, when the controller determines that the front force signal is greater than the back force signal and the front force deviation is greater than the first threshold value and the back force deviation is greater than the second threshold value, it indicates that the state of high tension occurs in the muscles of the lower leg during dorsiflexion of the foot; when the controller determines that the front force signal is smaller than the back force signal and the front force deviation is greater than the first threshold value and the back force deviation is greater than the second threshold value, it indicates that the state of high tension occurs in the muscles of the lower leg during plantar flexion of the foot.

Preferably, the front force standard deviation is defined as $$\delta_{front}, \delta_{front} = \sqrt{\frac{1}{N}\sum_{i=1}^{N}(f_{fi} - \mu_f)^2},$$

the back force standard deviation is defined as $$\delta_{back}, \delta_{back} = \sqrt{\frac{1}{N}\sum_{i=1}^{N}(f_{bi} - \mu_b)^2},$$

N is the number of data collected in the first time interval, $f_{fi}$ is the force value of the $i^{th}$ data of the front force signal in the first time interval, $\mu_f$ is the average value of N numbers of $f_{fb}$, $f_{bi}$ is the force value of the $i^{th}$ data of the back force signal in the first time interval, λ0 is the average value of N numbers of $f_{bi}$, the front force deviation is defined as $$\delta_{tf}, \delta_{tf} = \sqrt{\frac{1}{N_t}\sum_{i=1}^{N_t}\left(f_{tf_i} - \mu_f\right)^2},$$

the back force deviation is defined as $$\delta_{tb}, \delta_{tb} = \sqrt{\frac{1}{N_t}\sum_{i=1}^{N_t}\left(f_{tb_i} - \mu_b\right)^2},$$

$N_t$ is the number of data collected in the second time interval, $f_{tbi}$ is the force value of the $i^{th}$ data of the front force signa in the second time interval 1, $f_{tbi}$ is the force value of the $i^{th}$ data of the back force signal in the second time interval.

Preferably, the first threshold value is defined as $\delta_f, \delta_f = 2*\delta_{front}*\delta_{factor}$, the second threshold value is defined as $\delta_b, \delta_b = 2*\delta_{back}*\delta_{factor}\delta_{factor}$ is the sensitivity; when $\delta_{factor}=1$, the first threshold value is 2 times the front force standard deviation, and the second threshold value is 2 times the back force standard deviation. In other words, if the sensitivity is less than 1, the first threshold value and the second threshold value will become smaller, indicating that that it is easier to determine the state of high tension of the muscle. If the sensitivity is greater than 1, the first threshold value and the second threshold value will become larger, indicating that it is not easy to determine the state of high tension of the muscle.

Preferably, the calf support unit further comprises an upper support and a lower support. The lower support has a top end thereof pivotally connected to a bottom end of the upper support. The pedal is fixed at an opposing bottom of the lower support. The actuating unit comprises a cylinder and a piston rod. The cylinder has a top end thereof pivotally connected to the upper support. The piston rod is linearly displaceable on the cylinder and has a bottom end thereof pivoted on the pedal. The pivot angle of the lower support is defined as $\theta_1$, $\theta_1=180°-\theta_t-\theta_2-\theta_3$, θt is the angle formed between $L_1$ and $$L_2, \theta_t = \cos^{-1}\left(\frac{\left(\left(L_1^2 + L_2^2\right) - L_3^2\right)}{2 \times L_1 \times L_2}\right),$$

$L_1$ is the straight-line distance between the pivot axis of the lower support and the pivot axis of the cylinder, $L_2$ is the straight-line distance between the pivot axis of the lower support and the pivot axis of the piston rod, $L_3$ is the straight-line distance between the pivot axis of the cylinder and the pivot axis of the piston rod, $\theta_2$ is the angle formed between $A_2$ and $L_2$, $A_2$ is the axis passing through the pivot axis of the lower support and is perpendicular to the pedal, $\theta_3$ is the angle formed between $A_1$ and $L_1$, $A_1$ is the axis passing through the fixed axis of the upper support and the pivot axis of the lower support. With the above-mentioned technical features, after the state of high tension is released, the foot is driven to the target angle gradually in a manner of increasing a specific angle according to the above-mentioned pivot angle.

Preferably, the sensing unit comprises two front force sensors and two back force sensors. The two front force sensors are located at left and right corners in the front side relative to the pedaling area. The two back force sensors are located at left and right corners in the opposing rear side relative to the pedaling area.

It is another object of the present invention to provide a muscle tone assessment method suitable for the aforementioned muscle tone assessment device. The muscle tone assessment method comprises the steps of: a) before the actuating unit driving the pedal, the controller calculating a front force standard deviation and a back force standard deviation respectively according to several force values of the front force signal and the back force signal within a first time interval, and calculating a first threshold value and a second threshold value according to the front force standard deviation and the back force standard deviation, respectively; b) the actuating unit driving the pedal, so that the pedal drives the foot to move within a target angle; and c) during the movement of the foot, the controller respectively calculating a front force deviation and a back force deviation of the front force signal and the back force signal relative to the first time interval at each second time interval, where the second time interval is less than the first time interval, wherein a state of high tension occurs in the muscles of the lower leg, and the actuating unit stops driving the pedal when the front force deviation is greater than the first threshold value and the back force deviation is greater than the second threshold value.

Preferably, in step c), when the controller determines that the front force signal is greater than the back force signal and the front force deviation is greater than the first threshold value and the back force deviation is greater than the second threshold value, it indicates that the state of high tension occurs in the muscles of the lower leg during dorsiflexion of the foot, and the actuating unit stops driving said pedal; when the controller determines that the front force signal is smaller than the back force signal and the front force deviation is greater than the first threshold value and the back force deviation is greater than the second threshold value, it indicates that the state of high tension occurs in the muscles of the lower leg during plantar flexion of the foot, and the actuating unit stops driving the pedal.

Preferably, when the pedal stops moving until the state of high tension is released, the actuating unit continues to drive the pedal, so that the pedal drives the foot to the target angle.

Preferably, after the pedal stops moving, calculate the pivot angle of the lower support. When the muscles of the lower leg are released from the high tension state, the foot is driven to the target angle gradually in a manner of increasing a specific angle according to the pivot angle of the lower support.

The detailed structure, characteristics, assembly or usage of the muscle tone assessment device and its assessment method provided by the present invention will be described in the detailed description of the subsequent preferred embodiment. However, those with ordinary knowledge in the field of the present invention should be able to understand that this detailed description and the specific preferred embodiment enumerated for implementing the present invention are only used to illustrate the present invention, and are not intended to limit the scope of the patent application of the present invention.

DETAILED DESCRIPTION OF THE INVENTION

Figure 1:
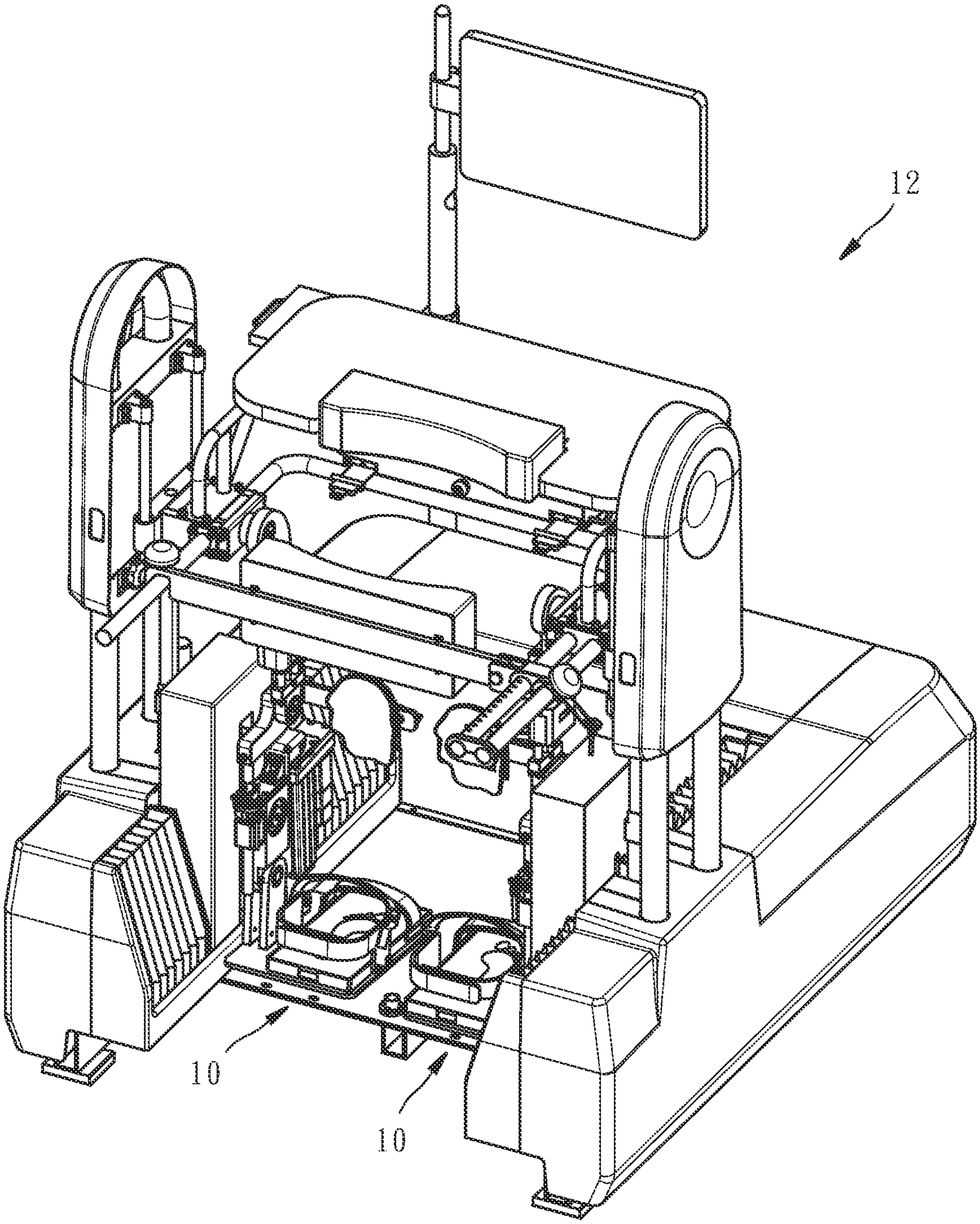
FIG. 1 is an oblique top elevational view that the muscle tone assessment device of the present invention cooperates with the gait training machine.

The applicant first explains here that throughout the specification, including the embodiments described below and the claims in the scope of the patent application, the nouns related to directionality are based on the directions in the drawings. Secondly, in the embodiments and drawings that will be introduced below, the same element numbers represent the same or similar elements or their structural features.

Please refer to FIG. 1 first, the muscle tone assessment device 10 of the present invention is mainly used in conjunction with the gait training machine 12, so that the patient uses the muscle tone assessment device 10 of the present invention to relieves the muscle strength of the lower limbs to reduce the risk of training injuries before using the gait training machine 12 for gait training.

Figure 2:
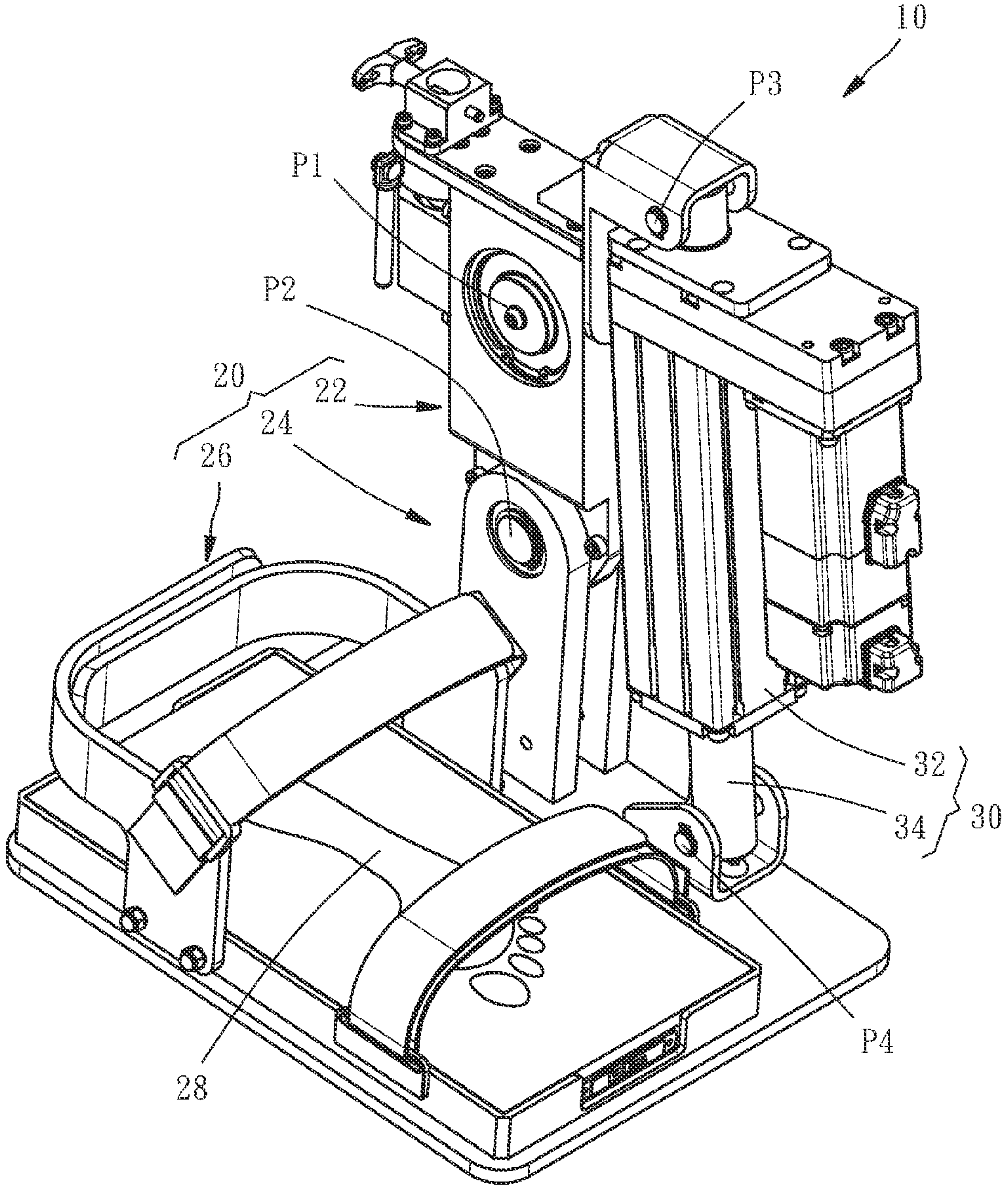
FIG. 2 is an oblique top elevational view of the muscle tone assessment device of the present invention.
Figure 4:
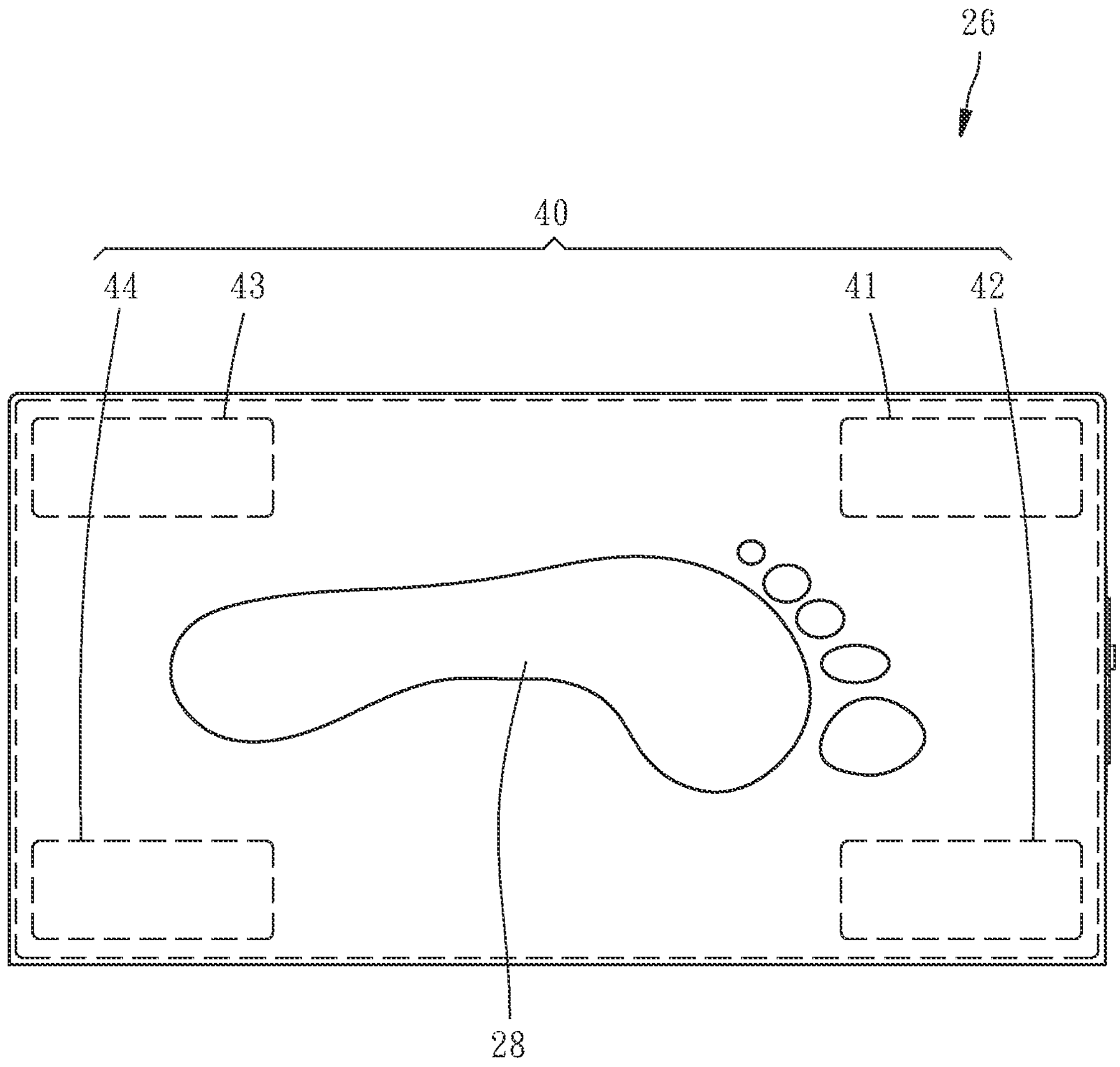
FIG. 4 is the top view of the pedal provided by the muscle tone assessment device of the present invention.
Figure 6:
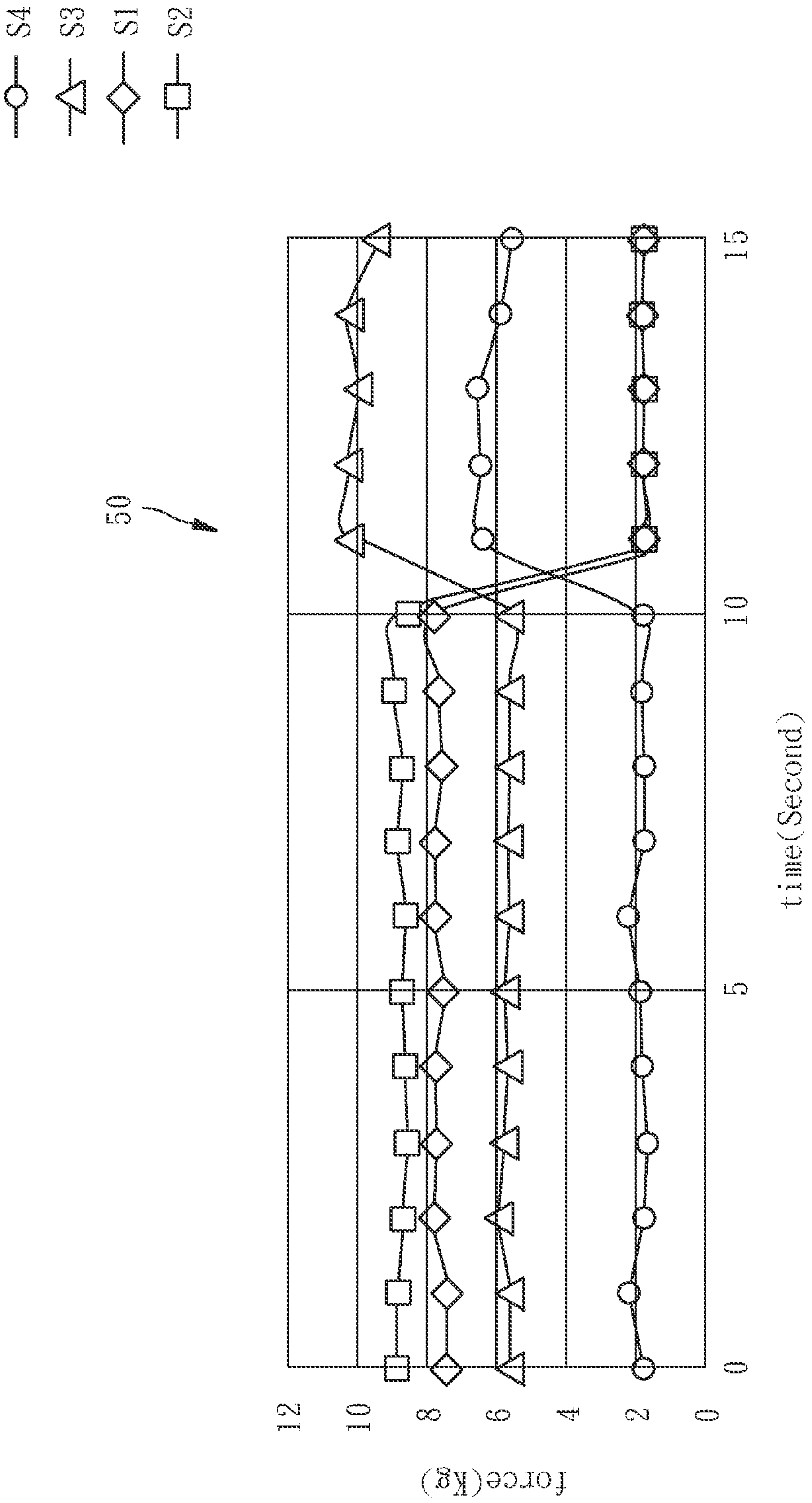
FIG. 6 is a graph of the front force signals and back force signals provided by the muscle tone assessment device of the present invention, which mainly shows that a state of high tension occurs when the foot performs dorsiflexion movement.

Please also refer to FIG. 2, FIG. 4 and FIG. 6, the muscle tone assessment device 10 of the present invention comprises a calf support unit 20, an actuating unit 30, a sensing unit 40, and a controller 50.

Figure 3:
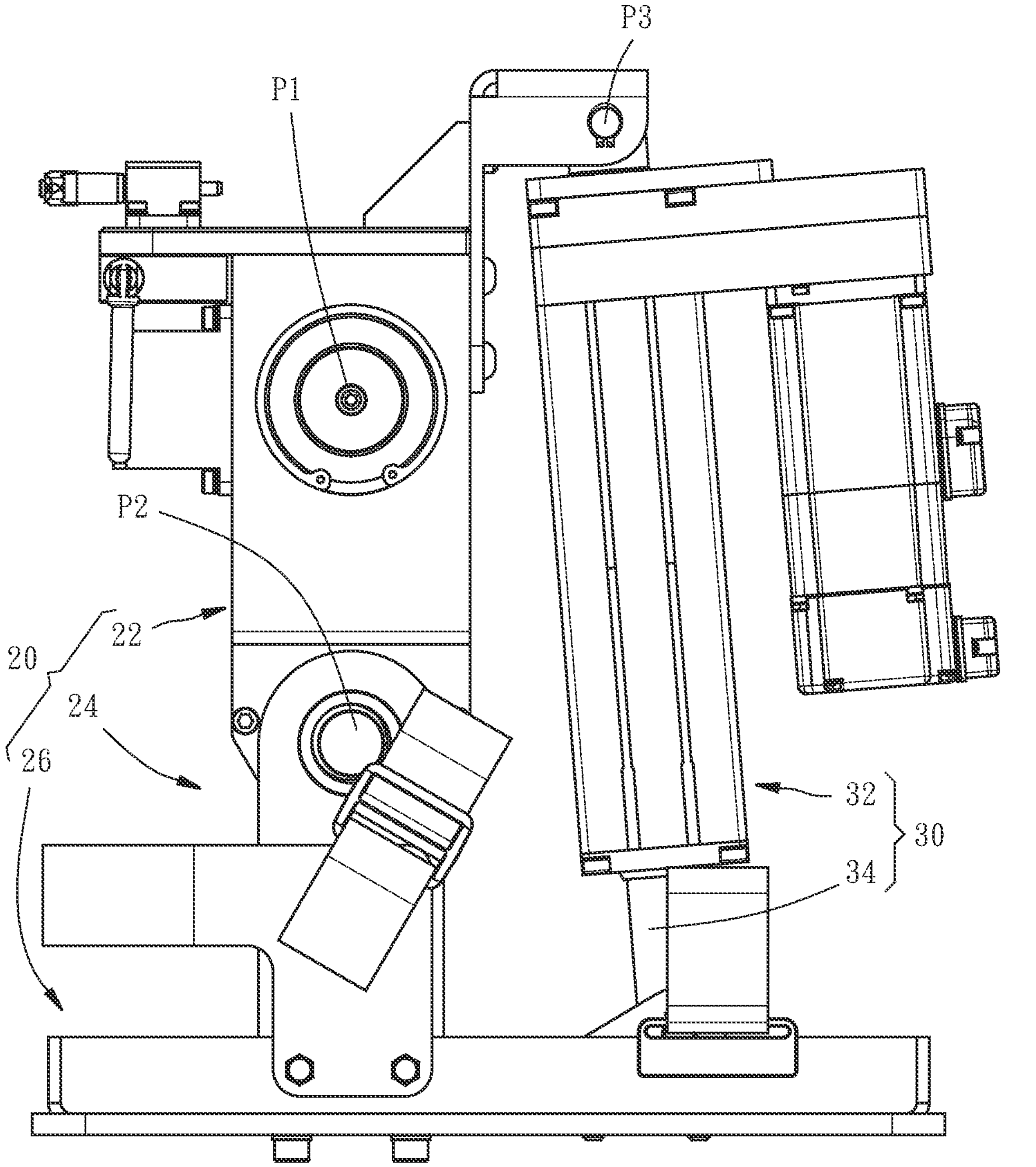
FIG. 3 is a side view of the muscle tone assessment device of the present invention.
Figure 5:
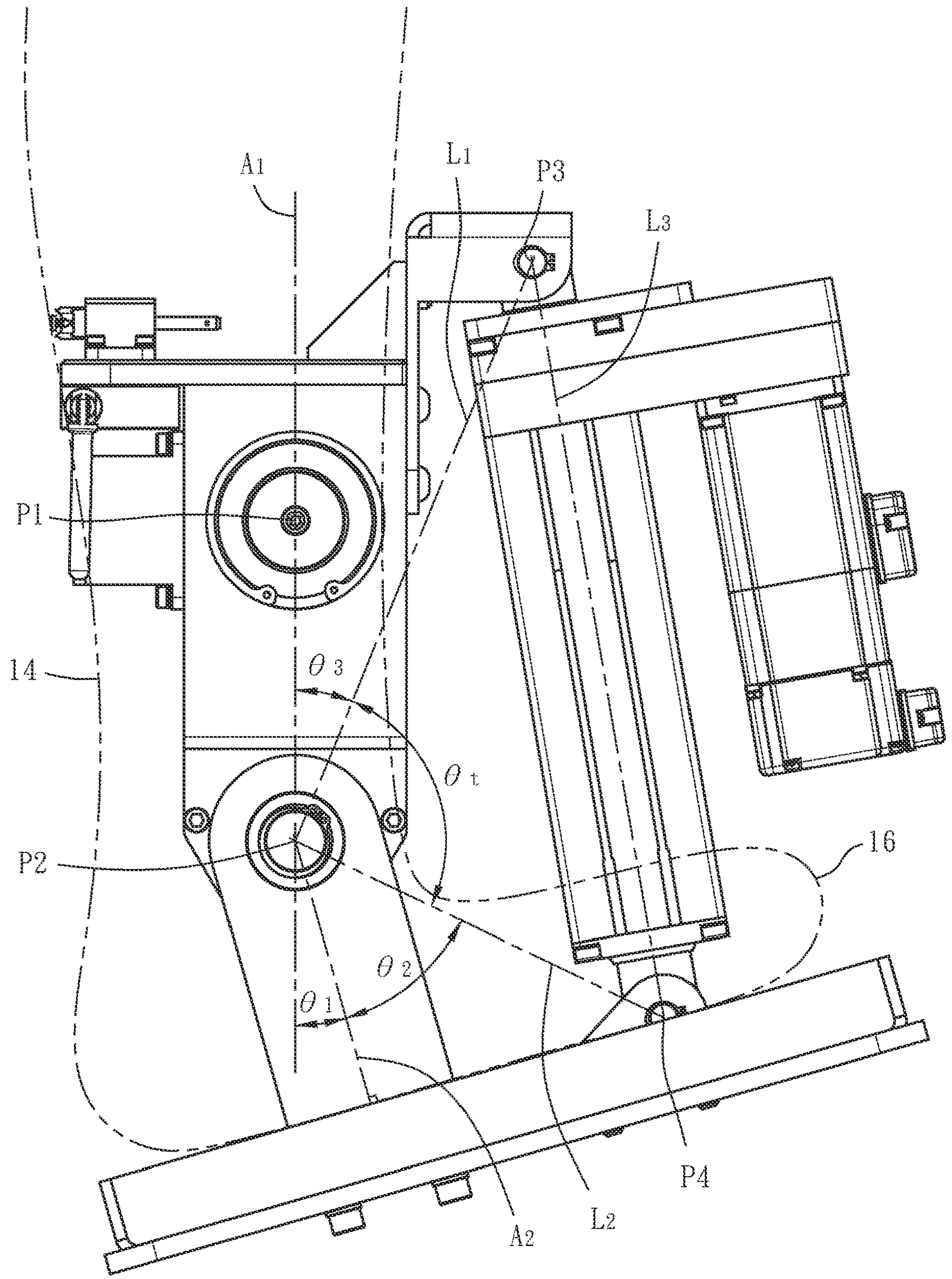
FIG. 5 is similar to FIG. 3, mainly showing the dorsiflexion movement of the foot.
Figure 7:
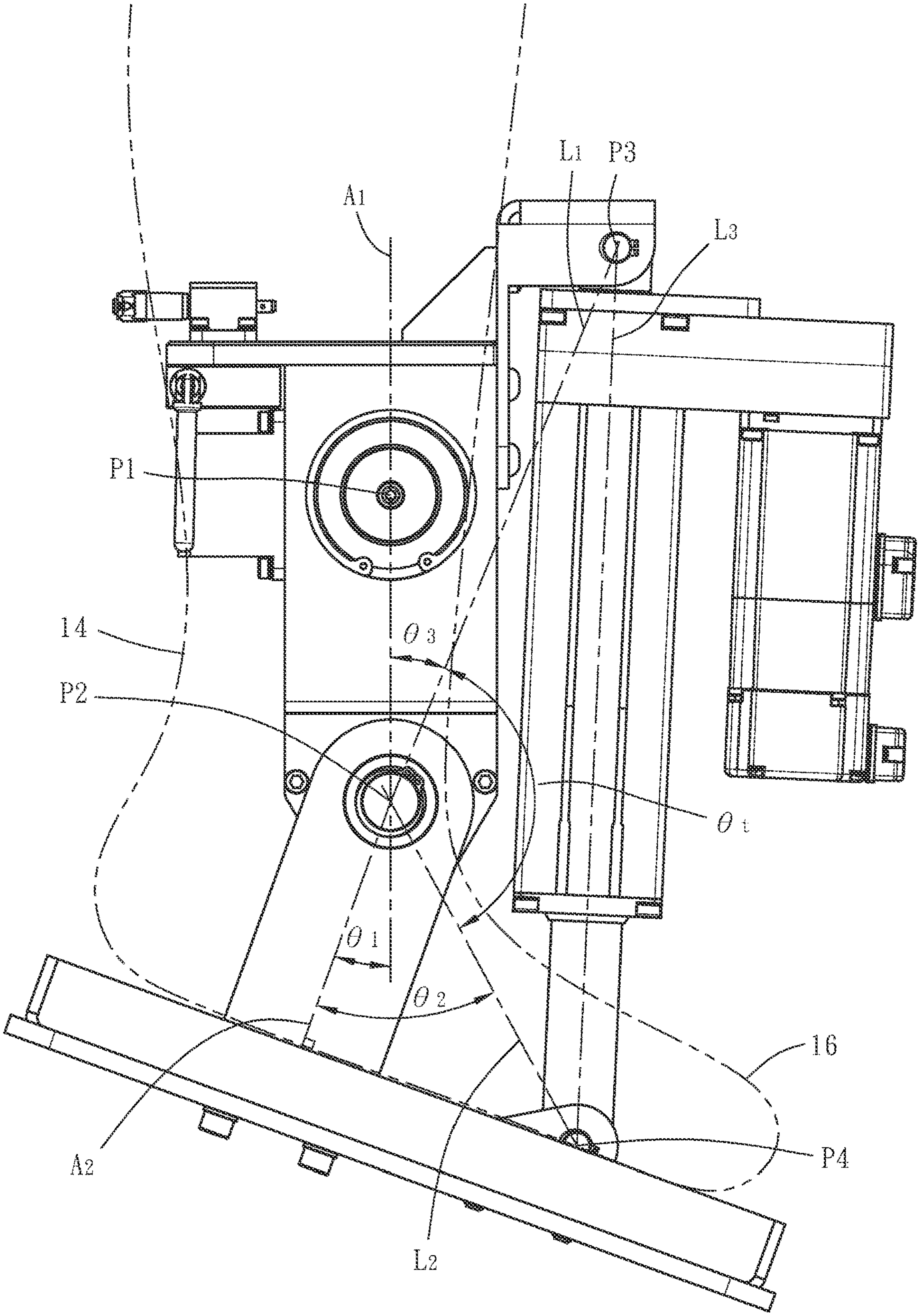
FIG. 7 is similar to FIG. 5, mainly showing the plantar flexion movement of the foot.

As shown in FIGS. 2 and 3, the calf support unit 20 comprises an upper support 22, a lower support 24 and a pedal 26. The upper support 22 is fixed to the gait training machine 12 with a first shaft P1. The top of the lower support 24 is pivoted to the bottom of the upper support 22 by a second shaft P2. The upper support 22 and the lower support 24 are used together to support the lower leg 14 (as shown in FIGS. 5 and 7). The pedal 26 is fixed on the bottom end of the lower support 24, and the pedal 26 has a pedaling area 28 for carrying the foot 16 (as shown in FIGS. 5 and 7).

The actuating unit 30 of this embodiment is a linear actuator (but not limited to this), comprising a cylinder 32 and a piston rod 34. The top of the cylinder 32 is pivoted on the upper support 22 by a third shaft P3. The piston rod 34 can be linearly displaced on the cylinder 32. The bottom end of the piston rod 34 is pivoted to the pedal 26 with a fourth shaft P4.

Figure 8:
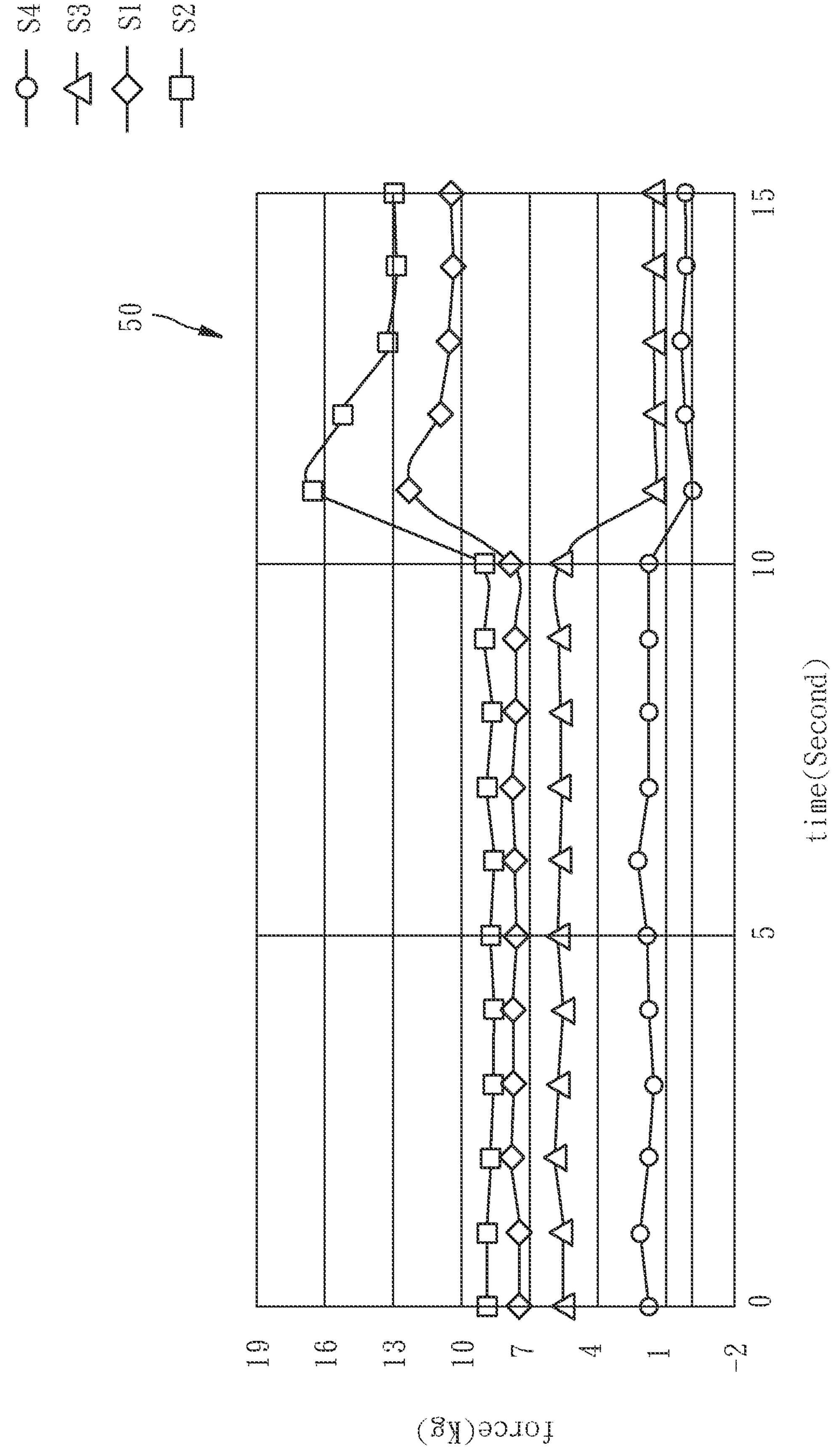
FIG. 8 is similar to FIG. 6, and mainly shows that the high tension state occurs when the foot performs plantar flexion movement.

As shown in FIG. 4, the sensing unit 40 comprises two front force sensors 41, 42 (actually at least one is sufficient) and two back force sensors 43, 44 (actually at least one is sufficient). The front force sensors 41, 42 are embedded in the pedal 26 and located at the left and right corners in front of the pedaling area 28, for sensing the front pedaling force and correspondingly sending two front force signals S4, S3 (as shown in FIG. 6 and FIG. 8). The back force sensors 43 and 44 are embedded in the pedal 26 and located at the left and right corners behind the pedaling area 28 for sensing the rear pedaling force and correspondingly sending two back force signals S1 and S2 (as shown in FIG. 6 and FIG. 8).

The controller 50 is electrically connected to the sensing unit 40. Before the actuating unit 30 drives the pedal 26, the controller 50 calculates a front force standard deviation and a back force standard deviation respectively according to the several force values of the front force signals S4, S3 and the back force signals S1, S2 in a first time interval. After the actuating unit 30 drives the pedal 26, the controller 50 respectively calculates a front force deviation and a back force deviation of the front force signals S4, S3 and the back force signals S1, S2 in each second time interval relative to the first time interval, where the second time interval is less than the first time interval, the front force standard deviation is defined as $$\delta_{front},\ \delta_{front} = \sqrt{\frac{1}{N}\sum_{i=1}^{N}(f_{fi} - \mu_f)^2},$$

the back force standard deviation is defined as $$\delta_{back},\ \delta_{back} = \sqrt{\frac{1}{N}\sum_{i=1}^{N}(f_{bi} - \mu_b)^2},$$

N is the number of data collected in the first time interval, $f_{fi}$ is the force value of the $i^{th}$ data of the front force signal S3, S4 in the first time interval, $\mu_f$ is the average value of N numbers of $f_{fi}$, $f_{bi}$ is the force value of the $i^{th}$ data of the back force signal S1, S2 in the first time interval, $\mu_b$ is the average value of N numbers of $f_{bi}$, the front force deviation is defined $$\delta_{tf},\ \delta_{tf} = \sqrt{\frac{1}{N_t}\sum_{i=1}^{N_t}\left(f_{tf_i} - \mu_f\right)^2},$$

the back force deviation is defined $$\delta_{tb},\ \delta_{tb} = \sqrt{\frac{1}{N_t}\sum_{i=1}^{N_t}\left(f_{tb_i} - \mu_b\right)^2},$$

$N_t$ is the number of data collected in the second time interval, $f_{tfi}$ is the force value of the $i^{th}$ data of the front force signal S3, S4 in the second time interval, $f_{tbi}$ is the force value of the $i^{th}$ data of the back force signal S1, S2 in the second time interval.

When the patient stands on the gait training machine 12, the lower leg 14 and the foot 16 are supported by the calf support unit 20, before the actuating unit 30 drives the pedal 26, take FIG. 6 and FIG. 8 as an example, set 0-5 seconds as the first time interval. The controller 50 calculates the front force standard deviation and the back force standard deviation in the first time interval. When the actuating unit 30 starts to drive the pedal 26 (that is, it starts to drive the patient's feet), for example, starting from the 6th second, the controller 50 calculates the front force deviation and the back force deviation in each second time interval. Here the second time interval is set to 1 second, which means that the controller 50 calculates a set of front force deviation and back force deviation every 1 second. The aforementioned first time interval and second time interval can be adjusted according to actual needs, and are not limited to the time intervals shown in FIG. 6 and FIG. 8. In addition, it should be supplemented that the data shown in FIG. 6 and FIG. 8 are marked as the amount of data collected during the judgment process. Due to the large number of data, for the convenience of display, in this embodiment, one of every 10 pieces of data is marked, in fact, the number of collected data is much larger than the marks displayed on the drawing.

The controller 50 further calculates a first threshold value and a second threshold value according to the front force standard deviation and the back force standard deviation, respectively. When the controller 50 determines that the front force deviation is greater than the first threshold value and the back force deviation is greater than the second threshold value, it means that a state of high tension occurs in the muscles of the lower leg 14, that is, the muscles of the lower leg 14 are in a state of high tension. In this embodiment, the first threshold value is defined as $\delta_f$,$\delta_f$=2*$\delta_{front}$*$\delta_{factor}$, the second threshold value is defined as $\delta_b$, $\delta_b$=2*$\delta_{back}$*$\delta_{factor}$$\delta_{factor}$ is the sensitivity. When $\delta_{factor}$=1, the first threshold value is 2 times the front force standard deviation, and the second threshold value is 2 times the back force standard deviation. However, in fact, the sensitivity can be adjusted according to actual needs. If the sensitivity is less than 1, the first threshold value and the second threshold value will become smaller, which means that it is easier to determine the state of high tension. On the contrary, if the sensitivity is greater than 1, the first threshold value and the second threshold value will become larger, indicating that it is difficult to determine the state of high tension.

When the controller 50 determines that the front force signals S3, S4 are greater than the back force signals S1, S2, and the front force deviation is greater than the first threshold value and the back force deviation is greater than the second threshold value, as shown in FIG. 5 and FIG. 6, it is shown that the front force signals S3 and S4 rise sharply in the interval of 10~11 seconds, and the back force signals S1 and S2 fall sharply in the interval of 10~11 seconds. It means that the force values of the front force signals S3, S4 and the back force signals S1, S2 in the 10th to 11th seconds are far away from the force values of the 0th to 5th seconds (i.e. the first time interval). It indicates that the muscles of the lower leg 14 are hypertonic during dorsiflexion of the foot 16. When the controller 50 determines that the front force signals S3, S4 are smaller than the back force signals S1, S2, and the front force deviation is greater than the first threshold value and the back force deviation is greater than the second threshold value, as shown in FIG. 7 and FIG. 8, it is shown that the back force signals S1 and S2 rise sharply in the interval of 10~11 seconds, and the front force signals S3 and S4 fall sharply in the interval of 10~11 seconds. It also means that the force values of the front force signals S3, S4 and the back force signals S1, S2 in the 10th to 11th seconds are far away from the force values of the 0th to 5th seconds (i.e. the first time interval). It indicates that the muscles of the lower leg 14 are hypertonic during plantar flexion of the foot 16.

Figure 9:
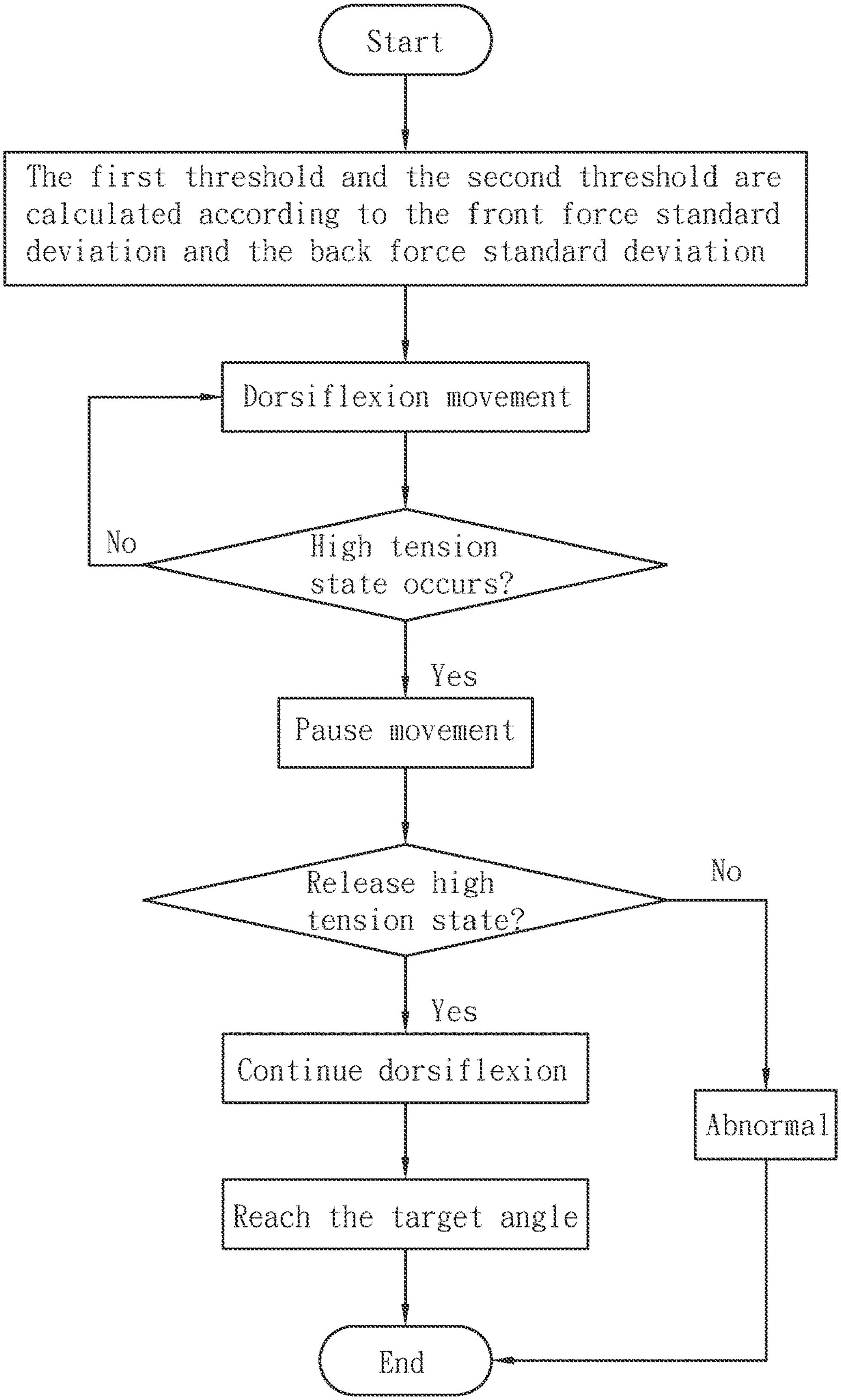
FIG. 9 is the flow chart of the muscle tone assessment method of the present invention.
Figure 10:
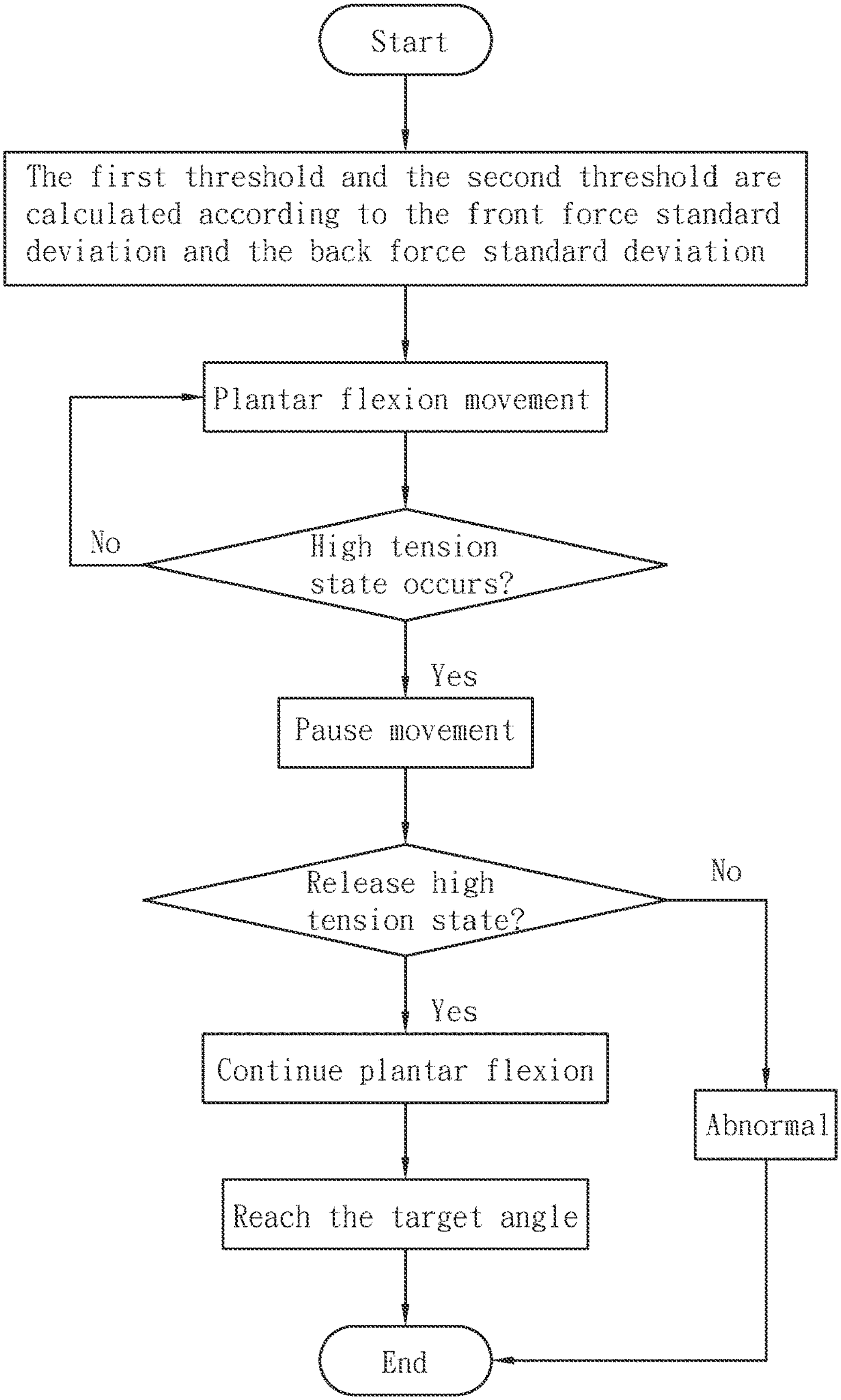
FIG. 10 is another flow chart of the muscle tone assessment method of the present invention.

The above are the structural features of the muscle tone assessment device 10 of the present invention. The muscle tone assessment method of the present invention will be further described below, as shown in FIG. 9 and FIG. 10, which comprises the following steps:

a) Before the actuating unit 30 drives the pedal 26, the controller 50 calculates a front force standard deviation and a back force standard deviation respectively according to several force values of the front force signals S3, S4 and the back force signals S1, S2 within a first time interval, and calculates a first threshold value and a second threshold value according to the front force standard deviation and the back force standard deviation, respectively.

b) The actuating unit 30 drives the pedal 26 with the piston rod 34, so that the pedal 26 drives the foot 16 to perform plantar flexion or dorsiflexion movement within a set target angle. It should be noted here that patients can choose to perform plantar flexion exercise first and then dorsiflexion exercise, or they can choose to perform dorsiflexion exercise first and then perform plantar flexion exercise, and there is no certain order between the two.

c) During the movement of the foot, the controller 50 respectively calculates a front force deviation and a back force deviation of the front force signals S3, S4 and the back force signals S1, S2 relative to the first time interval at each second time interval, where the second time interval is less than the first time interval. Whether dorsiflexion or plantar flexion is performed first, during the dorsiflexion movement of the foot 16, when the controller 50 determines that the front force signals S3, S4 are greater than the back force signals S1, S2, and the front force deviation is greater than the first threshold value and the back force deviation is greater than the second threshold value, it indicates that the muscles of the lower leg 14 are hypertonic during dorsiflexion of the foot 16. At this time, the actuating unit 30 stops driving the pedal 26. On the other hand, when the controller 50 determines that the front force signals S3 and S4 are smaller than the back force signals S1 and S2, and the front force deviation is greater than the first threshold value and the back force deviation is greater than the second threshold value, it indicates that the muscles of the lower leg 14 are hypertonic during plantar flexion of the foot 16. At this time, the actuating unit 30 stops driving the pedal 26.

d) After the pedal 26 stops moving, further calculate the current pivot angle of the lower support 24, as shown in FIG. 5 and FIG. 7. The pivot angle of the lower support 24 (that is, the angle of the ankle joint) is defined as $\theta_1$, $\theta_1$=180°−$\theta_t$−$\theta_2$-$\theta_3$,θt is the angle formed between $L_1$ and $L_2$. According to the law of cosines, when $L_1$,$L_2$,$L_3$ are known lengths, $\theta_t$ can be calculated.

$$\theta_t = \cos^{-1}\left(\frac{((L_1^2 + L_2^2) - L_3^2)}{2 \times L_1 \times L_2}\right),$$

$L_1$ is the straight-line distance between the pivot axis of the lower support 24 (i.e. the second shaft P2) and the pivot axis of the cylinder 32 (i.e. the third shaft P3), $L_2$ is the straight-line distance between the pivot axis of the lower support 24 (i.e. the second shaft P2) and the pivot axis of the piston rod 34 (i.e. the fourth shaft P4), $L_3$ is the straight-line distance between the pivot axis of the cylinder 32 (i.e. the third shaft P3) and the pivot axis of the piston rod 34 (i.e. the fourth shaft P4), $\theta_2$ is the angle formed between $A_2$ and $L_2$, $A_2$ is the axis passing through the pivot axis of the lower support 24 (i.e. the second shaft P2) and is perpendicular to the pedal 26, $\theta_3$ is the angle formed between $A_1$ and $L_1$, $A_1$ is the axis passing through the fixed axis of the upper support 22 (i.e. the first shaft P1) and the pivot axis of the lower support 24 (i.e. the second shaft P2).

After obtaining the aforementioned angle $\theta_1$, wait for a period of time (about 30 seconds) from the controller 50 to confirm whether the muscles of the lower leg 14 are released from the state of high tension. If the state of high tension is not released, it means that the lower leg 14 is abnormal. The operation must be stopped first, and the patient must be moved to a suitable place to confirm the physical condition. On the contrary, if the state of high tension has been released, according to the pivoting angle Q, of the lower support 24, drive the foot 16 to the target angle gradually by increasing a specific angle (in this embodiment, the specific angle is 1 degree, but not limited to 1 degree in practice). Then, the foot 16 is driven to repeatedly perform plantar flexion and dorsiflexion movements by following the above steps. Until it is confirmed that the muscles of the lower leg 14 are not in the state of high tension during the plantar flexion and dorsiflexion movements of the foot 16 within the target angle, the foot 16 can then be moved back and forth within the target angle to complete the relief of muscle tension.

To sum up, the muscle tone assessment device 10 of the present invention depends on whether the front force deviation is greater than the first threshold value and whether the back force deviation is greater than the second threshold value to determine whether the muscles of the lower leg 14 are in the state of high tension. Once the state of high tension has occurred, the actuating unit stops driving the pedal to reduce the risk of injury. After the tension of the muscles of the lower leg 14 is relieved, the following gait training can be performed immediately. Therefore, there is no need to move the patient and spend extra effort by physical therapists or trainers to relieve the tension of the muscles of the lower leg 14 of the patient, so as to improve the training efficiency.

What is claimed is:

1. A muscle tone assessment device, comprising:

a calf support unit to support a lower leg, said calf support unit comprising a pedal, said pedal comprising a pedaling area, said pedaling area being used to carry the foot;

an actuating unit adapted for driving said pedal to rotate;

a sensing unit comprising at least one front force sensor and at least one back force sensor, said at least one front force sensor being embedded in said pedal and located in a front side relative to said pedaling area for sensing a front pedaling force and correspondingly sending a front force signal, said at least one back force sensor being embedded in said pedal and located in an opposing rear side relative to said pedaling area for sensing a back pedaling force and correspondingly sending a back force signal; and a controller electrically connected to said sensing unit;

wherein before said actuating unit drives said pedal, said controller calculates a front force standard deviation and a back force standard deviation respectively according to several force values of said front force signal and said back force signal in a first time interval and also calculates a first threshold value and a second threshold value according to said front force standard deviation and said back force standard deviation; after said actuating unit drives said pedal, said controller respectively calculates a front force deviation and a back force deviation of said front force signal and said back force signals in each second time interval relative to said first time interval where said second time interval is less than said first time interval; when said front force deviation is greater than said first threshold value and said back force deviation is greater than said second threshold value, it means that a state of high tension occurs in the muscles of the lower leg;

wherein when said controller determines that said front force signal is greater than said back force signal and said front force deviation is greater than said first threshold value and said back force deviation is greater than said second threshold value, it indicates that the state of high tension occurs in the muscles of the lower leg during dorsiflexion of the foot: when said controller determines that said front force signal is smaller than said back force signal and said front force deviation is greater than said first threshold value and said back force deviation is greater than said second threshold value, it indicates that the state of high tension occurs in the muscles of the lower leg during plantar flexion of the foot;

wherein said calf support unit further comprises an upper support and a lower support, said lower support having a top end thereof pivotally connected to a bottom end of said upper support; said pedal is fixed at an opposing bottom of said lower support: said actuating unit comprises a cylinder and a piston rod, said cylinder having a top end thereof pivotally connected to said upper support, said piston rod being linearly displaceable on said cylinder and having a bottom end thereof pivoted on said pedal.

2. The muscle tone assessment device as claimed in claim 1, wherein said front force standard deviation is defined as $$\delta_{front},\ \delta_{front} = \sqrt{\frac{1}{N}\sum_{i=1}^{N}(f_{fi} - \mu_f)^2},$$

said back force standard deviation is defined as $$\delta_{back},\ \delta_{back} = \sqrt{\frac{1}{N}\sum_{i=1}^{N}(f_{bi} - \mu_b)^2},$$

N is the number of data collected in said first time interval, $f_{fi}$ is the force value of the $i^{th}$ data of said front force signal in said first time interval, $\mu_f$ is the average value of N numbers of $f_{fi}$, $f_{bi}$ is the force value of the $i^{th}$ data of said back force signal in said first time interval, $\mu_b$ is the average value of N numbers of $f_{bi}$, said front force deviation is defined as $$\delta_{tf},\ \delta_{tf} = \sqrt{\frac{1}{N_t}\sum_{i=1}^{N_t}(f_{tf_i} - \mu_f)^2},$$

said back force deviation is defined as $$\delta_{tb},\ \delta_{tb} = \sqrt{\frac{1}{N_t}\sum_{i=1}^{N_t}(f_{tb_i} - \mu_b)^2},$$

$N_t$ is the number of data collected in the second time interval, $f_{tfi}$ is the force value of the $i^{th}$ data of said front force signal in said second time interval, $f_{bi}$ is the force value of the $i^{th}$ data of said back force signal in said second time interval.

3. The muscle tone assessment device as claimed in claim 2, wherein said first threshold value is defined as $\delta_f$, $\delta_f=2*\delta_{front}*\delta_{factor}$, said second threshold value is defined as $\delta_b$, $\delta_b=2*\delta_{back}*\delta_{factor}$, $\delta_{factor}$ is the sensitivity; when $\delta_{factor}=1$, said first threshold value is 2 times said front force standard deviation, and said second threshold value is 2 times said back force standard deviation.

4. The muscle tone assessment device as claimed in claim 1, wherein the pivot angle of said lower support is defined as $\theta_1$, $\theta_1=180°-\theta_t-\theta_2-\theta_3$, θt is the angle formed between $L_1$ and $$L_2,\ \theta_t = \cos^{-1}\left(\frac{((L_1^2 + L_2^2) - L_3^2)}{2 \times L_1 \times L_2}\right),$$

$L_1$ is the straight-line distance between the pivot axis of said lower support and the pivot axis of said cylinder, $L_2$ is the straight-line distance between the pivot axis of said lower support and the pivot axis of said piston rod, $L_3$ is the straight-line distance between the pivot axis of said cylinder and the pivot axis of said piston rod, $\theta_2$ is the angle formed between $A_2$ and $L_2$, $A_2$ is the axis passing through the pivot axis of said lower support and is perpendicular to said pedal, $\theta_3$ is the angle formed between $A_1$ and $L_1$, $A_1$ is the axis passing through the fixed axis of said upper support and the pivot axis of said lower support.

5. The muscle tone assessment device as claimed in claim 1, wherein said sensing unit comprises two said front force sensors and two said back force sensors, said two front force sensors being located at left and right corners in the front side relative to said pedaling area, said two back force sensors being located at left and right corners in the opposing rear side relative to said pedaling area.

* * * * *